United States Patent
Ross

(10) Patent No.: US 9,260,960 B2
(45) Date of Patent: Feb. 16, 2016

(54) METHOD AND APPARATUS FOR SUBSEA WIRELESS COMMUNICATION

(75) Inventor: Donald W. Ross, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 948 days.

(21) Appl. No.: 13/293,752

(22) Filed: Nov. 10, 2011

(65) Prior Publication Data

US 2012/0133525 A1    May 31, 2012

Related U.S. Application Data

(60) Provisional application No. 61/412,514, filed on Nov. 11, 2010.

(51) Int. Cl.
| | |
|---|---|
| *H04B 13/02* | (2006.01) |
| *G01V 3/00* | (2006.01) |
| *E21B 7/12* | (2006.01) |
| *E21B 29/12* | (2006.01) |
| *E21B 34/04* | (2006.01) |
| *E21B 41/04* | (2006.01) |
| *E21B 47/12* | (2012.01) |
| *G01V 1/38* | (2006.01) |

(52) U.S. Cl.
CPC ............... *E21B 47/12* (2013.01); *E21B 47/124* (2013.01); *G01V 1/3808* (2013.01)

(58) Field of Classification Search
CPC ..... E21B 41/04; E21B 47/0001; E21B 47/12; E21B 33/076; E21B 43/017; E21B 41/0007; E21B 47/00; B63G 8/01; B63C 11/40; B63C 11/42

USPC ........ 340/850, 852, 853.9, 856.2, 856.3, 901, 340/902; 166/335, 350, 351
See application file for complete search history.

(56) References Cited

U.S. PATENT DOCUMENTS

| | | | |
|---|---|---|---|
| 4,052,703 A * | 10/1977 | Collins et al. ..................... 714/2 |
| 4,578,675 A | 3/1986 | MacLeod | |
| 4,806,928 A | 2/1989 | Veneruso | |
| 4,839,644 A | 6/1989 | Safinya et al. | |
| 5,172,112 A | 12/1992 | Jennings | |
| 5,955,666 A | 9/1999 | Mullins | |
| 6,151,961 A | 11/2000 | Huber et al. | |
| 6,160,492 A | 12/2000 | Herman | |
| 6,192,980 B1 | 2/2001 | Tubel et al. | |
| 6,223,675 B1 | 5/2001 | Watt et al. | |
| 6,252,518 B1 | 6/2001 | Laborde | |
| 6,603,977 B1 | 8/2003 | Walsh et al. | |
| 6,655,453 B2 | 12/2003 | Head | |

(Continued)

FOREIGN PATENT DOCUMENTS

| | | |
|---|---|---|
| GB | 2353546 A | 2/2001 |
| GB | 2369759 A1 | 5/2002 |

(Continued)

*Primary Examiner* — Firmin Backer
*Assistant Examiner* — Jerold Murphy

(57) ABSTRACT

System and method for communicating the state of a downhole subsea well which includes a wellbore with at least one sensor disposed within it. Information from the wellbore is communicated to a seabed data governor which is disposed on the seafloor. The seabed data governor includes buoyant signaling devices and a release module allowing the release of the buoyant signaling devices which then travel to the sea surface.

14 Claims, 3 Drawing Sheets

(56) References Cited

U.S. PATENT DOCUMENTS

| | | |
|---|---|---|
| 6,831,571 B2 | 12/2004 | Bartel |
| 6,917,611 B2 | 7/2005 | Dorenbosch et al. |
| 2002/0104661 A1 | 8/2002 | Head |
| 2004/0204856 A1 | 10/2004 | Jenkins et al. |
| 2007/0024464 A1* | 2/2007 | Lemenager et al. ....... 340/853.1 |
| 2008/0042869 A1* | 2/2008 | Zimmerman ............. 340/853.2 |
| 2009/0315563 A1* | 12/2009 | Fox et al. ...................... 324/345 |
| 2010/0213942 A1 | 8/2010 | Lazarev |
| 2011/0088609 A1* | 4/2011 | Vosburgh ..................... 114/321 |

FOREIGN PATENT DOCUMENTS

| | | |
|---|---|---|
| WO | 01/43372 | 6/2001 |
| WO | 01/63804 A1 | 8/2001 |

* cited by examiner

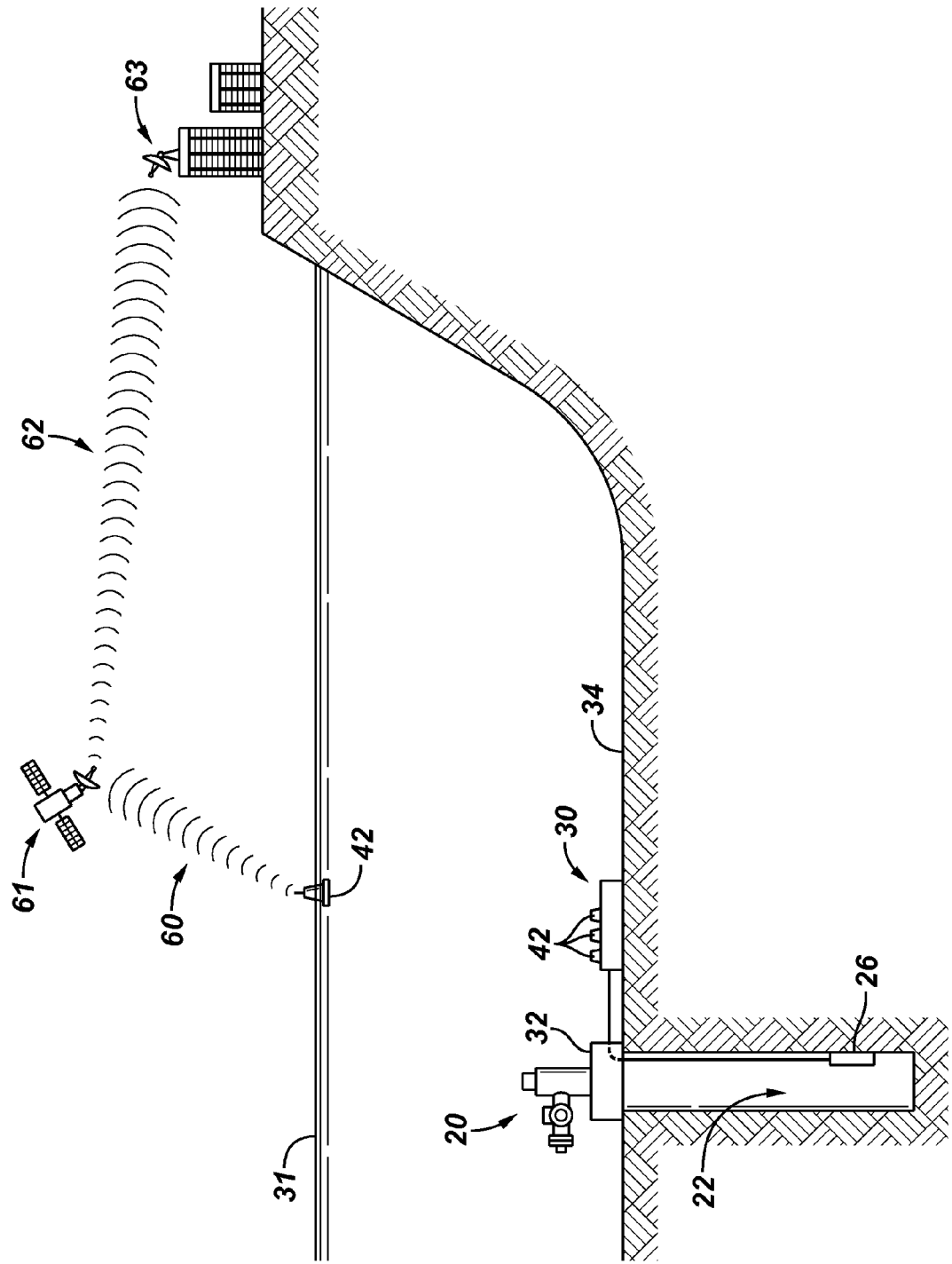

METHOD AND APPARATUS FOR SUBSEA WIRELESS COMMUNICATION

CROSS-REFERENCE TO RELATED APPLICATION

The present document is based on and claims priority to U.S. Provisional Application Ser. No. 61/412,514 filed Nov. 11, 2010, incorporated herein by reference.

BACKGROUND

Hydrocarbon fluids such as oil and natural gas may be obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. In some instances, the well completion components may obtain information or data that is indicative of the conditions within the wellbore. This information, once obtained by the well completion component, often needs to be transmitted to a user so that they can determine the state or status of the well.

SUMMARY

In an embodiment, a system for communicating the state of a downhole subsea well includes a wellbore with at least one sensor disposed within it. A means of communicating information from the sensor to the wellhead is included, as well as a seabed data governor which is disposed on the seafloor proximate wellhead. The seabed data governor includes a plurality of buoyant signaling devices and a release module, and it receives information from the sensor in the wellbore. In an embodiment, a method of communicating the state of a subsea well includes transmitting information from a sensor disposed in the a subsea wellbore to a seabed data governor which is disposed on the seafloor proximate the wellbore's wellhead. Part or all of the information is stored one of a plurality of buoyant signaling devices which are part of the seabed data governor. The buoyant signaling device with the stored information is released from the seabed data governor and is brought from its location proximate the seabed floor to the sea surface.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of this disclosure.

FIG. 4 is a schematic illustration of an example of a system for communicating with a subsea well, according to an embodiment of the disclosure.

DETAILED DESCRIPTION

Figure 1:
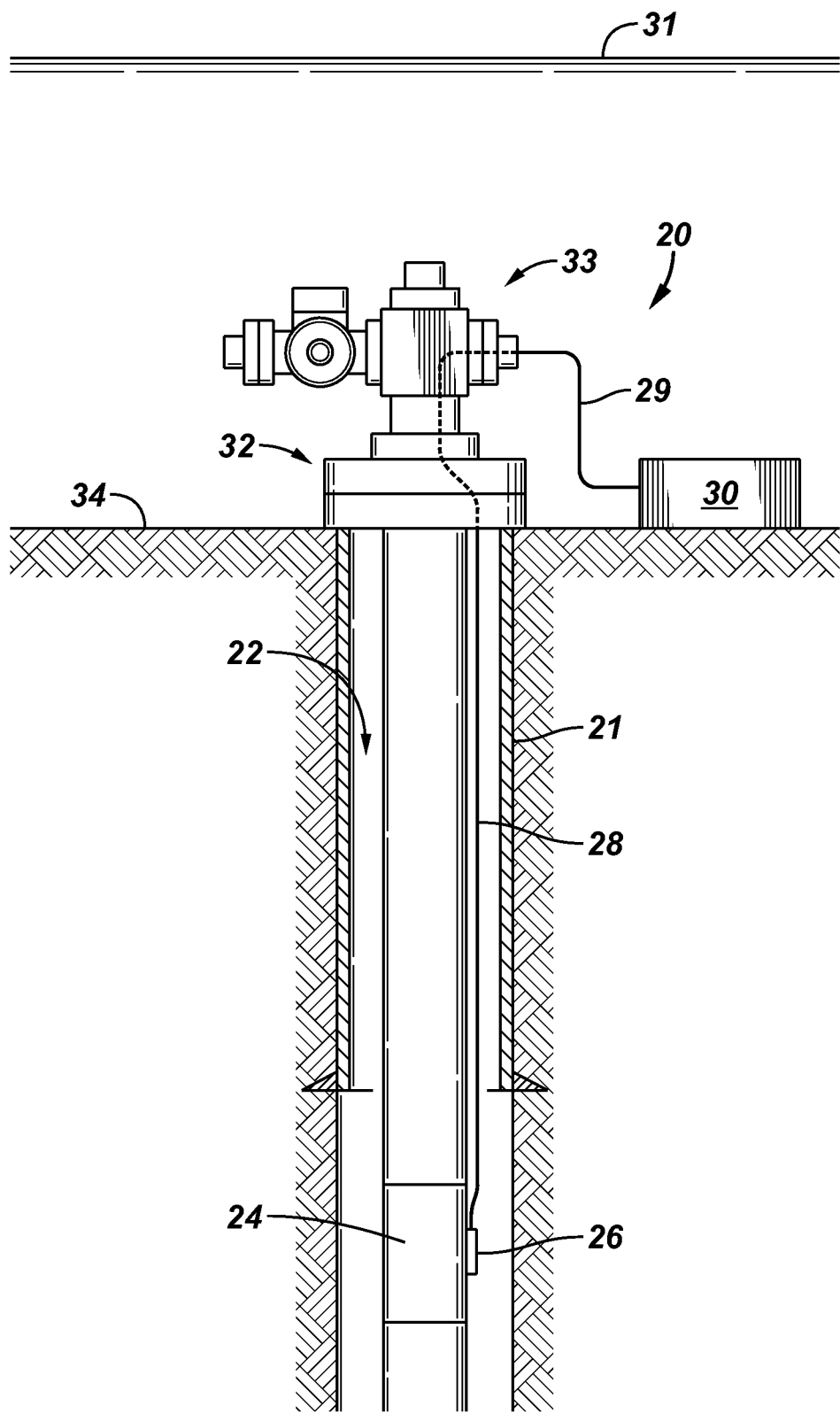
FIG. 1 is a schematic illustration of an example of a well system comprising a sensor, according to an embodiment of the disclosure.

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments. However, when applied to equipment and methods for use in environments that are deviated or horizontal, such terms may refer to a left to right, right to left, or other relationship as appropriate.

Embodiments of this disclosure generally relate to systems and methods for communicating the state of a subsea well. When a subsea well is in active production, communication to and with sensors deployed in the wellbore may typically be accomplished through a dedicated line or riser, from the subsea wellhead installation to the surface (e.g. to a surface vessel or to surface rig). This line or riser may also be incorporated in flow tube or flow path used to bring the well's hydrocarbons to the sea surface. Therefore, when the well is producing hydrocarbon, information on the state of the well can be brought to the sea surface along the same or similar path as is used to retrieve the hydrocarbon. Providing sea surface assets such as surface vessels or surface rigs is very capital intensive, but ultimately may be necessary in order to receive hydrocarbons from a producing subsea well.

In some instances however, subsea wells which are drilled and completed may nonetheless not be intended to produce hydrocarbon immediately or in the near future. For instance, depleted wells referred to as "Brownfield" wells may have reached the end of their useful producing life, and are no longer economically producing hydrocarbon. These wells may be plugged and abandoned (i.e. surface assets removed). Somewhat similarly, so-called "exploration" wells may be drilled and temporarily completed in order to carry out well tests to understand the well/reservoir properties prior to development of the overall oilfield. These exploration wells may then be plugged as well, until the rest of the field development plan can be implemented. In most cases, legislation and environmental regulations govern subsea wells, and require that once a subsea well is drilled (or plugged) that periodic information be received from the well regarding the well conditions or status (e.g. well temperature or pressure, fluctuations of either which may indicate a potential well leak). If the surface assets have been removed, it becomes very difficult to communicate with the subsea well to obtain the required periodic information. In some cases a surface asset is required to make periodic visits to the well and establish communication, often at great cost.

In an embodiment, a system for communicating the state of a downhole subsea well includes a wellbore with at least one sensor disposed within it. A means of communicating information from the sensor to the wellhead is included, as well as a seabed data governor which is disposed on the seafloor proximate wellhead. The seabed data governor includes a plurality of buoyant signaling devices and a release module, and it receives information from the sensor in the wellbore. In an embodiment, a method of communicating the state of a subsea well includes transmitting information from a sensor disposed in the a subsea wellbore to a seabed data governor which is disposed on the seafloor proximate the wellbore's wellhead. Part or all of the information is stored one of a plurality of buoyant signaling devices which are part of the seabed data governor. The buoyant signaling device with the stored information is released from the seabed data governor and is brought from its location proximate the seabed floor to the sea surface.

Referring generally to FIG. 1, an example of a subsea well system 20 is illustrated as deployed in a wellbore 22, according to one embodiment of the present disclosure. At least part of the wellbore 22 may be partially cased or cemented 21, or may be openhole. The subsea well system 20 comprises downhole equipment 24 that may be in the form of a downhole completion or other equipment. As illustrated, downhole equipment 24 comprises one or more downhole completion system components 26 that may be actuated or communicated with along a communication pathway 28. Communication pathway 28 provides a link between downhole equipment 24 and at least the wellhead 32 of wellbore 22. The communication pathway 28 may be routed at least in part along a pathway on the interior of a control line which is suitable for an electrical conductor, a fiber optic, or a hydraulic fluid to be disposed within. In some embodiments, actuation of, or communication to the downhole completion system components 26 may be achieved by communication along an electrical conductor, a fiber optic or hydraulic flow path disposed within a control line along communication pathway 28.

The configuration of well system 20 may vary substantially depending on the specific well application for which it is designed. Accordingly, the embodiment illustrated is simply an example to facilitate explanation of the present technique for deploying downhole components in a well. In the example illustrated in FIG. 1, downhole equipment 24 is deployed into the wellbore 22 via a conveyance 30, such as production tubing, coiled tubing, cable, or other suitable conveyance. The wellbore 22 extends downwardly from a well head 32 positioned at a seabed location 34. A subsea well containment system 33 (e.g. a "Christmas tree") may be positioned at the well head 32, so as to contain the contents of the well system 20 and stop the contents from entering the general surrounding environment outside of the wellbore (e.g. the sea).

In some embodiments, the downhole completion system component 26 illustrated in FIG. 1 may comprise, for example, a downhole control valve, a sensor, or a sensor gauge assembly. However, other types of downhole tools or devices may also be actuated or communicated with via the communication pathway 28. In embodiments when the downhole completion system component 26 is a sensor or a sensor gauge assembly, the sensor 26 may be disposed in numerous locations within well system 20. For instance, sensor 26 may be on either the inside or outside of conveyance 30, on either the inside or outside of casing 21, or even deployed in the open hole. In some embodiments, sensor 26 may be connected to communication pathway 28 to allow communication from the sensor 26 to the wellhead 32, while in other embodiments sensor 26 is capable of wireless communication to the wellhead 32 and beyond and is therefore not connected to communication pathway 28. In some embodiments, sensor 26 may be a discrete sensor, while in other embodiments, the sensor may be a distributed type sensor, such as a fiber optic cable which is deployed throughout the well system 20.

In some embodiments, a seabed data governor 30 may be disposed on the seafloor 34 proximate the wellhead 32. Proximate may be understood to mean close enough that the seabed data governor 30 may cooperatively communicate and operate with the various components of the well system 20. In some embodiments, a communication line 29 may connect the seabed data governor 30 to the other components of well system 20, in particular, to the wellhead 32 or to the subsea well containment system 33. In other embodiments, the seabed data governor 30 may communicate wirelessly with various elements of the well system 20, such as for example, the wellhead, the subsea well containment system 33, or the sensor 26.

Figure 2:
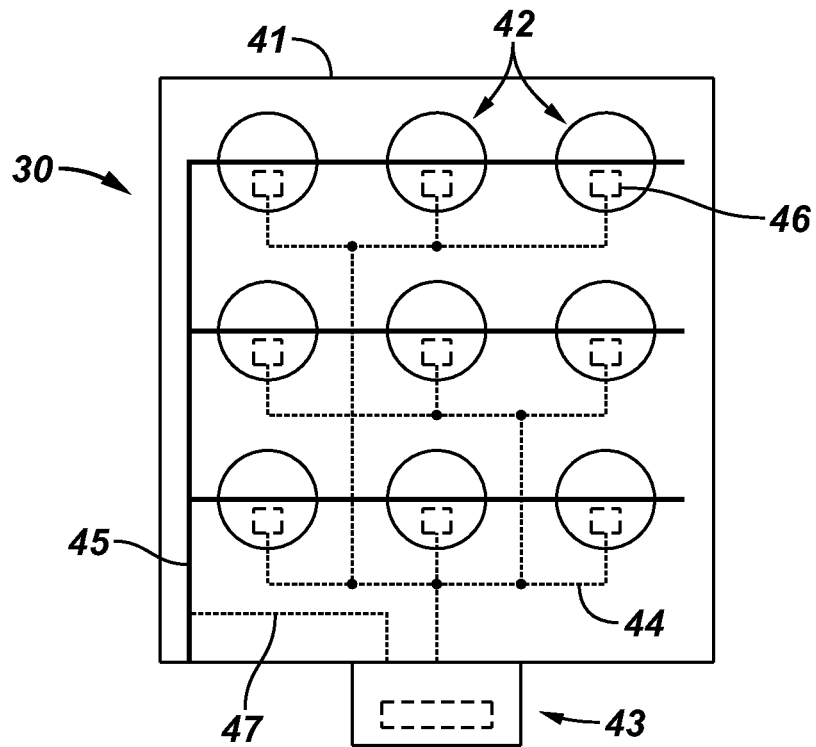
FIG. 2 is a schematic illustration of an example of a seabed data governor, according to an embodiment of the disclosure.

Referring generally to FIG. 2, an illustrative example of an embodiment for a seabed data governor 30 is shown. Seabed data governor 30 has an enclosure 41 within or on which a plurality of buoyant signaling devices 42 are disposed. While FIG. 2 shows nine such buoyant signaling devices 42, it should be understood that the total number buoyant signaling devices 42 is limited only by the overall space requirements of the buoyant signaling devices 42 and the data governor 30 itself. Accordingly, data governor 30 may hold more than nine signaling devices 42 depending upon the desired overall dimensions for the seabed data governor 30.

Seabed data governor 30 may also contain a controller 43, where the controller 43 is suitable to receive and store information received from the wellbore sensor 26. Controller 43 may be a conventional controller such as a CPU or PLC type controller, which is configured for the subsea environment. Controller 43 may receive information from the sensor 26 either via communication line 29, or wirelessly, in which case controller 43 may also contain a wireless communication module (not shown). Controller 43 may also contain a storage media suitable to store data received, such as information or data received from the wellbore sensor 26. The storage media of controller 43 may be sized accordingly so as to be able to store a large amount of data, over a long period of time, such as would be required for data generated by a typical wellbore sensor 26 (or a plurality of such sensors deployed in a wellbore). Seabed data governor 30 may also contain a data transmitting means 44 suitable to transmit data from the controller 43 to the buoyant signaling devices 42. Transmitting means 44 may be part of the controller 43, and may include communication pathways, such as wires or other communication pathways, that lead to each of the buoyant signaling devices 43, and in particular, to a data storage portion 46 of each buoyant signaling device 43. In other embodiments, transmitting means may be wireless in nature, such that the transmitting means 44 wirelessly transmits data from the controller 43 to data storage portion 46.

Seabed data governor 30 may also contain a release module 45 which is suitable to release a single buoyant signaling device 42 from the seabed data governor 30, according to a release input or signal 47 from the controller 43. As the buoyant signaling devices 42 are by their nature buoyant, they are restrained in some fashion so that they remain in the seabed data governor 30 and do not float away. Release module 45 is suitable to selectively remove this restraint, so that when desired, at least one of the buoyant signaling devices 42 becomes free to leave (via at least partially its buoyancy) the seabed data governor 30. In some embodiments release module 45 and restraint may be mechanical in nature (e.g. mechanical restraint member, latch, flange, etc), while in other embodiments release module 45 may employ other means of restraint, such as electromechanical servos/solenoids, magnetic restraints, or chemical/dissolving type restraints which dissolve over time by nature of their material properties. In some embodiments, regardless of the nature of release module 45 and restraint, release is done selectively so that a limited and controlled number of buoyant signaling devices 42 are released at a given time or through a given operation of the release module 45. In some embodiments, buoyant signaling device 42 may be released from the seabed data governor 30 by the release module 45 and restraint due to a release signal 47 from the controller 43.

Figure 3:
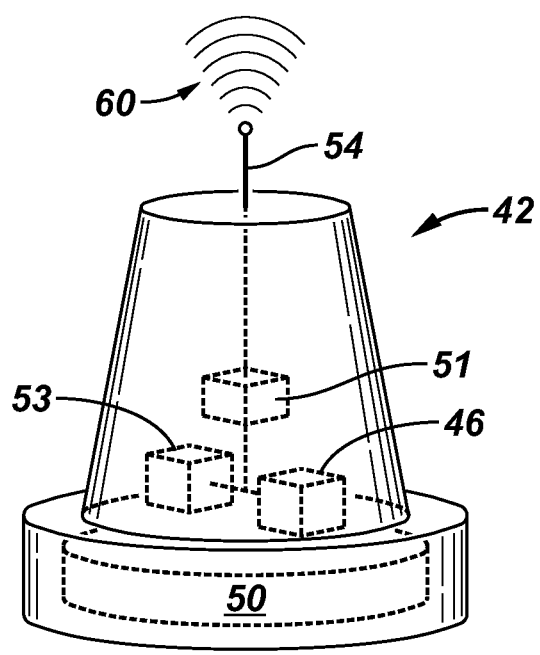
FIG. 3 is a schematic illustration of an example of a buoyant signaling device, according to an embodiment of the disclosure.

Referring generally to FIG. 3, an illustrative example of an embodiment for a buoyant signaling device 42 is shown. While shown in FIG. 3 as being generally cone shaped with a base portion, it should be understood that buoyant signaling device 42 may generally be of any shape or configuration (e.g. spherical, rectangular, rod shaped, etc). Likewise, the buoyant signaling device 42 may be constructed out of any material, provided that the shape and material selection results in a buoyant signaling device 42 that is sufficiently buoyant so that when released from the seabed data governor 30 on the seabed floor 34, the buoyant signaling device 42 will travel to the sea surface 31 primarily through buoyancy or by floating. In some embodiments of the buoyant signaling device 42 at least a portion of the device may include a buoyancy increasing section 50, which is suitable to increase the overall buoyancy of the signaling device 42. Examples of a buoyancy increasing section 50 include, but are not limited to hollow and enclosed sections, or sections that are made from a material different and/or more buoyant than the material used in the rest of the signaling device 42. In some embodiments, the overall shape or design, coupled with the material selection, results in a buoyant signaling device 42 which is sufficiently buoyant to rise from a location proximate the seabed floor, and travel to the sea surface. Once located on the sea surface, the buoyant signaling device 42 is sufficiently buoyant so as to remain at the sea surface for a suitable amount of time before sinking back towards the seabed (e.g. remaining at the surface for about a day, or remain at the surface for about a week, or remain at the surface for about a month, etc). In some embodiments, the buoyant signaling device 42 is sufficiently buoyant so as to remain at the sea surface indefinitely.

Some embodiments of the buoyant signaling device 42 also contain a data storage portion 46 that is suitable to store data transmitted to it by the transmitting means 44 of the controller 43 when the buoyant signaling device 42 is disposed in the seabed data governor 30. Additionally, a power source 53 and a transmitting device 51 are also present in some embodiments of the buoyant signaling device 42. Transmitting device 51 may also be a conventional type of transmitting device, which is suitable to transmit a signal 60 capable of being received by a receiver located a distance way, for example, by an orbiting communication satellite. Transmitting device 51 may also work in conjunction with an antenna 54. Power source 53 may be a conventional type power source, as known to be suited for subsea condition such that power source 53 is capable of maintaining power/charge for prolonged periods of time while deployed in subsea operations (e.g. in the seabed data governor 30). Additionally, power source 53 is properly sized and capable of containing sufficient power/charge to provide power to the transmitting device 51, thereby allowing transmitting device 51 to transmit its signal 60, either continuously or intermittently, for a suitable period of time (e.g. transmit for about a day, or transmit for about a week, or transmit for about a month, etc). In some embodiments, the power source 53, the transmitting device 51 and the data storage portion 46 may all be combined into a single unit/housing located on or in the buoyant signaling device 42.

Referring generally to FIG. 4, illustrative examples of embodiments for methods of communicating the state of a subsea well will now be described. As described previously with respect to FIG. 1, a sensor 26 may be disposed in a subsea wellbore 22. The sensor 26 collects information concerning the state of wellbore, and transmits this information to the seabed data governor 30 which is disposed on the seafloor, proximate the wellhead 32. The type of information collected and transmitted by the sensor 26, may vary but includes without limitation temperature, pressure, or flow type data, or other data indicative of conditions in the well proximate the sensor 26. The information from sensor 26 is initially stored by controller 43 of seabed data governor 30, and then at least part of the information is stored on at least one of the plurality of buoyant signaling devices 42 incorporated in the seabed data governor 42.

In some embodiments, in addition to storing the information from sensor 26, the controller 43 also performs some analysis of the received data to determine what part of the data should be selectively stored in the data storage portion 46 of the buoyant signaling device 42. Selective storage of data may be needed, as sensor 26 may transmit a large amount of information over time (e.g. over the life of the well), and it may not be practical or economical to store that large amount of data in the data storage portion 46 of the buoyant signaling device 42. Analysis and selective storing of the received data may be accomplished in a various, non limiting ways. One method may be for the controller to store data based on a clock function (e.g. store a data point (or points) of received data indicative of wellbore conditions every minute, every other minute, or every hour, etc). Another method may be for the controller to analyze the received data to determine a baseline for the well wellbore conditions, and only store a data point (or points) when the received data varies from the baseline by a certain predetermined percentage. Other conventional methods of analyzing or storing data from a subsea well may also be used. Once controller 43 determines the information received that is to be stored on buoyant signaling device 42, the determined information is then stored on or in the data storage portion 46 of the buoyant signaling device 42.

In some embodiments, part of the information selected by the controller for storing on buoyant signaling device 42 may include information relating to the number of buoyant signaling devices 42 previously released by the seabed data governor 30, and/or information relating to number of buoyant signaling devices 42 remaining in seabed data governor 30 which have not yet been released.

The buoyant signaling device 42 which contains the stored information may then be released from the seabed data governor 30. The release may be performed by the release module 45, thereby allowing the released buoyant signaling device 42 to travel to the sea surface 31. Similar to controller's 43 function of determining what information may selectively be stored in the buoyant signaling device 42, controller 43 may selectively determine when to release a given buoyant signaling device 42, by sending a signal to the release module 45 to initiate the release. In some embodiments, buoyant signaling device 42 may be released based on a clock function (e.g. release one device per day or one device per month, etc). In other embodiments, buoyant signaling device 42 may be released based on the nature of the information stored on it. For instance, the controller may analyze the received data to determine a baseline for the wellbore conditions, and release a buoyant signaling device 42 when the received data varies from the baseline by a certain predetermined percentage (after storing the received data on the signaling device 42, as described above). Likewise, controller may send a signal to initiate a release when any data received from sensor 26 is indicative of a change in well parameters, for example, a well leak. Other conventional methods of determining when to release a buoyant signaling device may also be used.

Once the buoyant signaling device 42 arrives proximate to the sea surface 31, it transmits a signal 60 containing at least part of the information transmitted by sensor 26, and selectively stored on the data storage portion 46 of buoyant signaling device 42. The signal 60 is transmitted by the data transmitting means 44 in a conventional manner (e.g. radio signal, etc). In some embodiments the signal 60 may begin transmitting when the buoyant signaling device 42 reaches a location proximate to the sea surface 31, while in others the signal 60 may begin transmitting when the buoyant signaling device 42 is released from the seabed data governor. In some embodiments signal 60 may be transmitted continuously, while in other embodiments signal 60 may be transmitted intermittently over a period of time (e.g. signal transmitted for 1 minute out of every hour, or one hour out of every day, etc). Once located proximate the sea surface 31, the buoyant signaling device 42 is sufficiently buoyant so as to remain at the sea surface 31 for a suitable amount of time before sinking back towards the seabed (e.g. remaining at the surface for about a day, or remaining at the surface for about a week, or remain at the surface for about a month, etc). In some embodiments, the buoyant signaling device 42 may be sufficiently buoyant so as to remain at the sea surface 31 indefinitely.

Signal 60 transmitted from the buoyant signaling device 42 at the sea surface 31, may then be received by a communication satellite 61. Communication satellite 61 may be a conventional satellite device suitable to receive various types of signals. Communication satellite 61 may then transmit a signal 62 which contains at least part of the information transmitted by sensor 26, selectively stored on the data storage portion 46 of buoyant signaling device 42, and transmitted to communication satellite 61 as signal 60. Signal 62 may then be received at a land based receiver device 63, where it may displayed and analyzed in a conventional manner (e.g. by software package on computer, etc). The information in signal 62, which can trace its origin back at least partially back to the information collected by sensor 26, may then be presented to a user who can use the information to determine and understand, at least partly, the state of the subsea well system 20.

In some embodiments, at least part of the information received by land based receiver device 63 in signal 62 may correspond to information relating to the number of buoyant signaling devices 42 previously released by the seabed data governor 30, and/or information relating to number of buoyant signaling devices 42 remaining in seabed data governor 30 which have not yet been released. From this information, it may be determined how much longer seabed data governor 30 will be able to collect and report data relating to the conditions of the well system 20. When it is determined that the overall number of buoyant signaling devices 42 remaining in the seabed data governor 30 is approaching a lower limit (e.g. approaching 10 remaining, or approaching zero remaining, etc), efforts may be undertaken to deploy assets so as to add additional buoyant signaling devices 42 to seabed data governor 30, or to replace the depleted seabed data governor 30 with a new one which contains additional buoyant signaling devices.

While a limited number of embodiments been described, those skilled in the art, having the benefit of this disclosure, will appreciate numerous modifications and variations there from. It is intended that the appended claims cover all such modifications and variations.

What is claimed is:

1. A system for communicating the state of a subsea well including a wellhead, comprising:
   a wellbore, with at least one sensor disposed therein; a means to communicate information from the sensor to the wellhead; a seabed data governor disposed on the seafloor proximate to the wellhead to receive information transmitted from the sensor, wherein the seabed data governor comprises:
   a housing;
   a plurality of buoyant signaling devices contained within the housing, each buoyant signaling device comprising a transmitting device to transmit a signal receivable by a remote receiver device after the buoyant signaling device is released from the seabed data governor, the signal containing a portion of the information received from the sensor disposed in the wellbore;
   a data storage to store the information received from the sensor;
   a controller to determine a portion of the received information to store on one of the plurality of buoyant signaling devices, to determine when the one buoyant signaling device should be released, and to generate a release signal to select for release only the one buoyant signaling device that is storing the determined portion of the received information; and
   a release module to selectively release only the one buoyant signaling device from the housing in response to the release signal.

2. The system of claim 1, further comprising:
   a communication satellite device suitable to receive a signal from at least one of the buoyant signaling devices, after the buoyant signaling device is released from the seabed data governor and travels to the sea surface; and
   a land based receiver device, suitable to receive a signal from the communication satellite device, the signal containing at least part of the information transmitted from the sensor disposed in the wellbore.

3. The system of claim 2, wherein the buoyant signaling devices further comprise:
   a power source; and
   a data storage device;
   wherein the power source is suitable to provide sufficient power for the data storage device to cooperate with the transmitting device, and transmit a signal of sufficient strength so as to be received by the satellite device.

4. The system of claim 3, wherein the seabed data governor further comprises a data transmitting means suitable to transmit the determined portion of the information into the data storage device portion of the one buoyant signaling device.

5. The system of claim 1, wherein the one buoyant signaling device is sufficiently buoyant that upon release from the seabed data governor, the one buoyant signaling device will float to sea surface, where it will be situated so as to communicate with the communication satellite device.

6. The system of claim 5, wherein the one buoyant signaling device is sufficiently buoyant to remain at the sea surface for a period of at least about 1 week.

7. A method of communicating the state of a subsea well including a wellhead, comprising:
   transmitting information from at least one sensor disposed in a subsea wellbore to a seabed data governor which is disposed on the seafloor, proximate the wellhead;

determining a portion of the information to store on one of a plurality of buoyant signaling devices which are contained within a housing of the seabed data governor;
determining the one buoyant signaling device to store the determined portion of the information;
storing the determined portion of the information on the one buoyant signaling device;
determining when to release the one buoyant signaling device;
selecting for release only the one buoyant signaling device that is storing the at least part of the information; and
releasing, in response to an input indicating the selection for release, only the one buoyant signaling device with the stored information from the housing of the seabed data governor;
bringing the released buoyant signaling device from its location on the seafloor to the sea surface; and
transmitting a signal from the buoyant signaling device for receipt by a communication satellite device, wherein the signal comprises at least part of the information received from the sensor.

8. The method of claim 7, further comprising:
receiving the signal transmitted from the buoyant signaling device at the communication satellite device;
transmitting a signal from the communication satellite device, wherein the signal comprises at least part of the information received from the sensor;
receiving the signal transmitted from the communication satellite device at a land based receiver device; and
determining a status of the downhole well, based upon the signal received by the land based receiver device.

9. The method of claim 8, wherein transmitting a signal from the buoyant signaling device further comprises the buoyant signaling device floating on the sea surface for a period of time ranging between about 1 week to about 1 month, and wherein the buoyant signaling device transmits the signal comprising at least part of the information received from the sensor during at least part of the time it is floating.

10. The method of claim 7, further comprising:
initially storing the information from at least one sensor in a controller disposed in the seabed data governor;
transmitting the determined portion of information to the buoyant signaling device.

11. The method of claim 7, further comprising:
determining the number of buoyant signaling devices remaining in the housing of the seabed data governor; and
adding additional buoyant signaling devices to the seabed data governor when the number of buoyant signaling devices in the housing of the governor reaches a lower limit.

12. The method of claim 7, further comprising determining when to release the one buoyant signaling device from the seabed data governor based upon the nature of the information stored on the buoyant signaling device.

13. The method of claim 7, further comprising determining when to release the one buoyant signaling device from the seabed data governor based upon a set schedule based on a clock function.

14. The method of claim 7, wherein bringing the buoyant signaling device to the sea surface comprises allowing the buoyant signaling device to float to the surface due to the buoyancy of the buoyant signaling device.

* * * * *